(12) United States Patent
Ni

(10) Patent No.: US 6,755,880 B2
(45) Date of Patent: Jun. 29, 2004

(54) DECELERATED CENTRIFUGAL DUST REMOVING APPARATUS FOR DUST CLEANER

(75) Inventor: Zugen Ni, Suzhou (CN)

(73) Assignee: Suzhou Kingclean Floorcare Co., Ltd., Suzhou (CN)

( * ) Notice: Subject to any disclaimer, the term of this patent is extended or adjusted under 35 U.S.C. 154(b) by 0 days.

(21) Appl. No.: 10/339,893

(22) Filed: Jan. 10, 2003

(65) Prior Publication Data

US 2003/0200736 A1 Oct. 30, 2003

(30) Foreign Application Priority Data

Apr. 28, 2002 (CN) .......................................... 02112963 A

(51) Int. Cl.[7] .............................................. B01D 45/12
(52) U.S. Cl. ...................................... 55/426; 55/459.1
(58) Field of Search ........................ 55/426, 428, 459.1, 55/459.3, 459.5; 210/512.1

(56) References Cited

U.S. PATENT DOCUMENTS

| | | | | |
|---|---|---|---|---|
| 1,841,556 A | * | 1/1932 | Stelz .............................. 96/57 |
| 2,071,975 A | * | 2/1937 | Holm-Hansen et al. ........ 55/413 |
| 2,681,124 A | * | 6/1954 | Van Der Kolk ................ 55/398 |
| 2,796,147 A | * | 6/1957 | Coanda ......................... 55/455 |
| 2,943,698 A | * | 7/1960 | Bishop ......................... 55/337 |
| 3,501,014 A | * | 3/1970 | Fitch, Jr. et al. .......... 210/512.1 |
| 4,221,655 A | * | 9/1980 | Nakayama et al. .......... 209/135 |
| 5,042,998 A | * | 8/1991 | Beusen ......................... 55/338 |
| 5,332,500 A | * | 7/1994 | Seureau et al. ........... 210/512.1 |
| 5,585,000 A | * | 12/1996 | Sassi ........................ 210/512.1 |
| 6,270,558 B1 | * | 8/2001 | Theiler ........................... 96/61 |
| 6,589,309 B2 | * | 7/2003 | Oh et al. ........................ 55/429 |
| 6,596,046 B2 | * | 7/2003 | Conrad et al. ................. 55/345 |

FOREIGN PATENT DOCUMENTS

EP 0 090 335 * 10/1983 ................. 55/426

* cited by examiner

Primary Examiner—Richard L. Chiesa
(74) Attorney, Agent, or Firm—Baker Botts L.L.P.

(57) ABSTRACT

The present invention discloses a decelerated centrifugal dust removing apparatus for a dust cleaner. It includes a cylinder, a conical cylinder and a dust collector box connected in the given order from the upper part to the lower part, as well as an air outlet pipe and an air inlet pipe on the cylinder body. The conical cylinder has a small upper end and a large lower end. In the conical cylinder, on the lower part of the air outlet pipe (under the air outlet pipe) there is an umbrella-shaped reflector in the center of which is provided a hole for air returning. Between the periphery of the umbrella reflector and the side wall is provided an annular gap for the falling down of dust. The apparatus features small loss of air flow pressure, good effectiveness of air suction, high quality of dust filtering, and low noise. With the apparatus, the secondary pollution of the cleaned air can be effectively prevented, and it is especially suitable for use in a secondary stage filtering system of the dust cleaner and for separating small and fine dust particles.

11 Claims, 3 Drawing Sheets

DECELERATED CENTRIFUGAL DUST REMOVING APPARATUS FOR DUST CLEANER

CLAIM FOR PRIORITY TO RELATED APPLICATIONS

This application claims the benefit of China Patent Application serial no. CN 02112963.0, filed on Apr. 28, 2002, which is hereby incorporated by reference in its entirety herein.

BACKGROUND OF THE INVENTION

1. Technical Field

The present invention relates to a decelerated centrifugal dust removing apparatus for a dust cleaner.

2. Background

Nowadays, dust cleaners are usually equipped with a filtering cover or a dust collecting bag, in order to filter dirty air sucked in by vacuum generating motor, and to let the dust particles stay in the dust collection cylinder or dust collecting bag. When the dust cleaner has been used for a certain period of time, the user should clean the filtering cover or dust collecting bag or replace it. Otherwise, after the filtering holes of the filtering cover or dust collecting bag have been blocked by fine dust particles, the vacuum generating motor will encounter higher resistance in sucking dust. If the blockage is serious, even the motor will be burned out. So, the structure of the conventional dust cleaner has some defects, which not only may bring trouble to the user, but also may affect the operating performance of the dust cleaner.

In order to overcome the above drawbacks, the so-called cyclone separation principle has been used in dust removing apparatus of dust cleaners by manufacturers, and which has resulted in good effects. In such cyclone separation type dust removing apparatus, a reverse cone shaped cylinder with a large upper end and a small lower end is placed in the dust collecting box. The upper end of the reverse cone shaped cylinder is closed and an air outlet pipe is longitudinally provided. The lower end of the reverse cone shaped cylinder is open to facilitate the falling down of dust into the bottom of the collecting box. An air inlet pipe is disposed in the upper side wall of the reverse cone shaped cylinder and enters along tangential direction to make the dirty air stream containing dust rotates in the reverse cone shaped cylinder, and by the centrifugal force dust particles will fall into the bottom of the dust collecting box along the side wall of the reverse cone shaped cylinder, dust removed air stream will go upward out through the air outlet pipe.

On Oct. 17, 2001, China Patent Bureau announced a utility model patent entitled "Separated Body Type Cyclone Dust Filtering Apparatus For Dust Cleaner." This utility model patent application was filed by the applicant, with the patent number ZL00266255.8 and the announcement number CN 2453827. The patent "discloses a kind of separated body type cyclone dust filtering apparatus for dust cleaner, which comprises a container on which are provided dirty air inlet and clean air outlet, said container is divided into 2 chambers: coarse dust particle chamber and fine dust particle chamber, the coarse dust particle chamber is equipped with a rotatable cylinder in which there is a filtering netted (mesh) pipe, the dirty air inlet is situated on the upper side of the coarse dust particle chamber, the fine dust particle chamber is equipped with a rotatable conical body, and the clean air outlet is on the rotatable conical body, said filtering netted (mesh) pipe is equipped with direction guiding air passage connected with the rotatable conical body; such apparatus has a cyclone separation structure which has changed the filtering manner of the traditional dust cleaner, and which, not only filters more cleanly the dirty air and dose not tend to increase the air suction resistance encountered by the motor, but also brings convenience to users."

As the rotating cone in the above invention is a reverse conical body, and the dust is separated by the accelerated rotation of air, the loss of air stream pressure is rather large, thereby the effect of dust cleaner is affected. Besides, the accelerated air stream tends to lift again fine dust already falling into the bottom, and this fine dust will go out from the air outlet pipe together with air flow, resulting in the secondary pollution of the cleaned air. In addition, the apparatus mentioned above is rather suitable for the separation of larger size dust particles, for small-size dust separation, its effect is not ideal.

SUMMARY OF THE INVENTION

An object of the present invention is to provide a decelerated centrifugal dust removing apparatus for a dust cleaner. The apparatus features small loss of air stream pressure, good effect on dust suction, high quality in filtering dust, and low noise. It can effectively avoid the secondary pollution of the cleaned air, and is especially suitable for use in the secondary filtering system of the dust cleaner to separate small and fine dust particles.

The scheme of the present invention is to provide a decelerated centrifugal dust removing apparatus for a dust cleaner, which comprises a cylinder, a conical cylinder and a dust collecting box connected one after another in the given order from top to bottom. On the upper end of the cylinder is provided an air outlet pipe. The air outlet pipe is longitudinally disposed and enters into the cylinder. On the outer wall of the cylinder is provided air inlet pipe. The conical cylinder has a small upper end and a large lower end. In the conical cylinder there is an umbrella-shaped reflecting disc under the air outlet pipe. In the center of the umbrella-shaped reflecting disc, there is provided a hole for air returning. Between the periphery of the umbrella-reflecting shaped reflecting disc and the side wall of the conical cylinder, there is an annular gap for the own of dust.

A further technical scheme of the present invention is: a decelerated centrifugal dust removing apparatus for a dust cleaner, which comprises a cylinder, a conical cylinder and a dust collecting box connected sequentially in the given order from top to bottom. On the upper end of the cylinder is provided an air outlet pipe. The air outlet pipe is longitudinally disposed and enters into the cylinder, on the outer wall of the cylinder is provided air inlet pipe. The conical cylinder has a small upper end and a large lower end. In the conical cylinder there is an umbrella-shaped reflecting disc under the air outlet pipe. In the center of the umbrella-shaped reflecting disc, there is provided a hole for air returning. Between the periphery of the umbrella-shaped reflecting disc and the side wall there is an annular gap for the falling down of dust, the air inlet pipe goes around the side wall of the cylinder at least by 90° of arc of a circle before it goes into the cylinder.

A still further technical scheme of the present invention is: a decelerated centrifugal dust removing apparatus for a dust cleaner, which comprises a cylinder, a conical cylinder and a dust collecting box connected sequentially in the given order from top to bottom. On the upper end of the cylinder is provided an air outlet pipe. The air outlet pipe is longitudinally disposed and enters into the cylinder. On the outer wall of the cylinder is provided air inlet pipe. The conical cylinder has a small upper end and a large lower end. In the conical cylinder there is an umbrella-shaped reflecting disc under the air outlet pipe, in the center of the umbrella-shaped reflecting disc there is provided a hole for air returning. Between the periphery of the umbrella-shaped reflecting disc and the side wall there is provided an annular gap for the falling down of dust. The air inlet pipe around the side wall of the cylinder at least by 90° of arc of a circle before it goes into the cylinder. Several ribs are provided in the gap for the falling down of dust to fix the connection of the umbrella-shaped reflector.

In the above schemes, the umbrella-shaped reflector can be installed either under the conical cylinder or above the dust collecting box.

The advantages of the present invention include the following:

1. Because the conical cylinder has the shape of small upper end and large lower end, the rotation of the air flow in the conical cylinder will be in a decelerated centrifugal state, so the loss of air flow pressure will be small, therefore the effect of air suction of dust cleaner will be ensured.
2. As the rotation speed of air in the lower part of the conical cylinder is smaller than that in the upper part, dust in the bottom of the dust collecting box will not be lifted again, therefore the air which goes out from the air outlet pipe will not be polluted, so the secondary pollution of the cleaned air can be avoided.
3. As the air inlet pipe goes around the cylinder at least by 90° of arc of a circle before it enters into the cylinder, the effect of the rotation of dirty air will be better after it enters into the cylinder.
4. The volume of prior art cyclone dust removing apparatus is relatively large, it is suitable for the separation of larger size dust particles, but is less effective in separating fine and smaller-size dust particles. By contrast, the present invention is more suitable for separating smaller and fine dust particles, especially suitable for use in the secondary filtering system of a dust cleaner.
5. The dimension of the dust removing apparatus of the present invention can be enlarged or reduced in proportion. When the dimension of the apparatus is smaller, its operating performance in dust filtering will be better.
6. The dust removing apparatus of the present invention can not only remove fine dust particles, but also can reduce noise.

The sound generated by the apparatus when in use is much lower than that generated by the prior art dust cleaner.

BRIEF DESCRIPTION OF THE DRAWINGS

The present invention will be described in detail with reference to the embodiment and the accompanying drawings, among the drawings.

DETAILED DESCRIPTION OF EXEMPLARY EMBODIMENT

Figure 1:
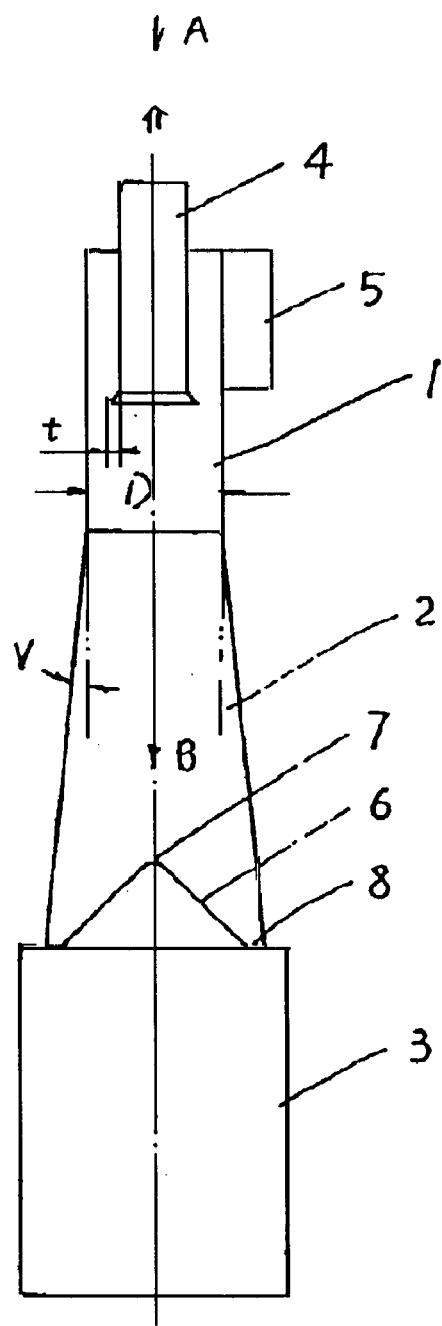
FIG. 1 is a schematic view of the stricture of the present invention.
Figure 2:
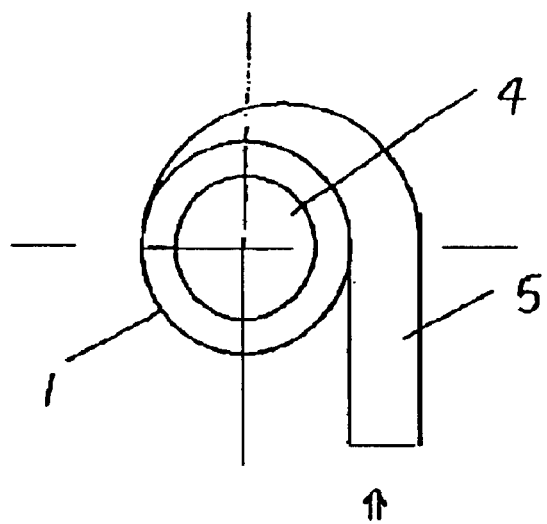
FIG. 2 is a schematic view in direction A.
Figure 3:
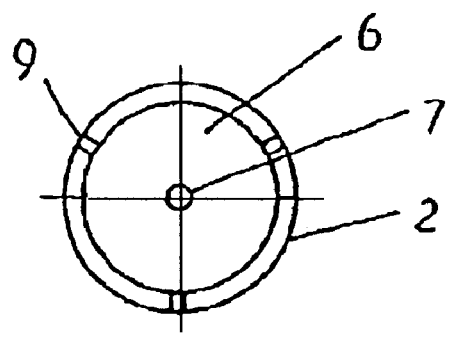
FIG. 3 is a schematic view in direction B.
Figure 4:
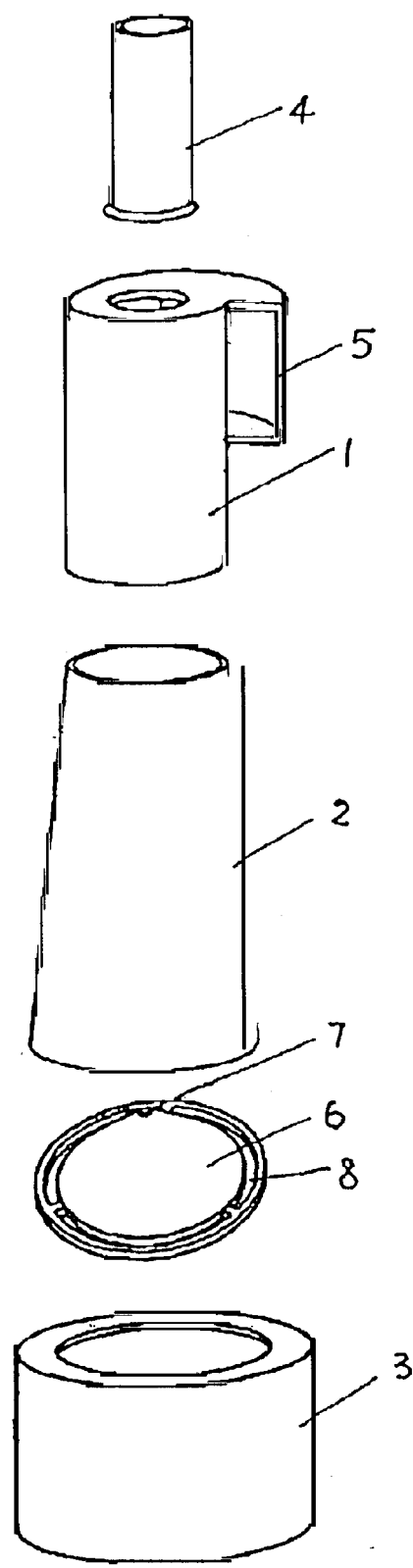
FIG. 4 is an exploded view of the components of the present invention; in which 1 is a cylinder; 2, a conical cylinder; 3, a dust collecting box; 4, an air outlet pipe; 5, an air inlet pipe; 6, an umbrella-shaped reflector (reflecting disc); 7, a hole for air returning; 8, an annular gap for the falling down of dust; 9, ribs.

An exemplary embodiment of the invention is shown in FIG. 1., FIG. 2, and FIG. 3. It is a decelerated centrifugal dust removing apparatus for use with a dust cleaner. It comprises a cylinder 1, a conical cylinder 2 and a dust collector box 3 connected one after another in the given order sequentially from the top to the bottom. On the top of the cylinder, an air outlet pipe 4 is disposed along the axis. The air outlet pipe 4 extends downwardly into the cylinder 1, the lower end of the air outlet pipe 4 has a flared shape. There is an air inlet pipe 5 connected on the outer side wall of the cylinder 1, and the air inlet pipe 5 goes around the cylinder/at least 90° of air of a circle before it enters into the cylinder 1. The conical cylinder 2 has a small upper end and a large lower end. The range of the optimum conical angle V is 5°–60°. An umbrella-shaped reflector (reflecting disc) 6 is provided in the lower part of the conical cylinder 2. There is an annular gap for the falling down of dust between the umbrella-shaped reflector (reflecting disc) 6 and the side wall of the conical cylinder. In the annular gap 8 for the falling down of the dust, there are ribs 9 for fixing the connection between the umbrella-shaped reflecting disc 6 and the conical cylinder 2. In the center of the umbrella-shaped reflecting disc 6 there is a hole 7 for returning air.

The optimum diameter D of the cylinder 1 is 18–80 mm and the optimum height there of is 0.8–1.5 D. The optimum diameter of air outlet pipe 4 is 3–40 mm. The range of the optimum width t of the flared end of the lower part of the air outlet pipe 4 is less than 0.3D. The optimum range of the conical angle V of the conical cylinder & is 5°–60°. The optimum range of the width to height is 0.1–1. The optimum diameter range of the hole 7 for air returning is less than 0.5D. The optimum diameter of the hole for the falling down of dust is less than 0.5D.

In operation, dust containing air stream enters into the cylinder 1 along tangential direction and will go to the umbrella-shaped reflecting disc 6 from top to bottom in a decelerated rotating manner. At this moment, the most part of air stream already cleaned by centrifugal force forms an upward revolving air stream and goes out from the air outlet pipe 4. The remaining air, together with the dust particles separated by centrifugal force, will slip down along the inner wall of the conical cylinder 2 in a spiral manner and finally enter into dust collecting box 3 through the annular gap 8 along the periphery of the umbrella-shaped reflecting disc 6. On the top of the umbrella-shaped reflecting disc 6, that is, in the center of the entire dust removing apparatus, no dust will be accumulated. Due to the existence of the umbrella-shaped reflecting disc (6), the raising of dust particles by the returning air flow will be prevented, thus avoiding the generation of the phenomenon of dust lifting (raising) and the secondary pollution of air. At the same time, the dust removing effectiveness is improved.

Due to the fact that the upper part of the conical cylinder 2 of the present invention is small and the lower part is large, when the air rotates in the conical cylinder 2, it is in a decelerated centrifugal state, so, the loss of air stream pressure is small, and the effect of dust suction of the dust cleaner will not be affected. The rotating speed in the lower part of the conical cylinder 2 is smaller than that in the upper part, so dust on the bottom of the dust collecting box 3 will not be lifted or raised and secondary pollution of the air going out through the air outlet pipe 4 will not be caused. The air inlet pipe 5 goes around the cylinder 1 at least by 90° of arc of a circle before it enters into the cylinder 1, which will make the rotation of the dust containing air stream rotate more effective after it enters into cylinder. The volume of the prior art cyclone dust removing apparatus is relatively large, therefore it is suitable for the separation of larger dust particles, but for the small dust particles the effectiveness is relatively lower. By contrast, the apparatus of the present invention is more suitable for the separation of small or fine dust particles. Especially, it is ideal to be used in the secondary filtering system of the dust cleaner. The dimension of the apparatus of the present invention can be enlarged or reduced in proportion. When the dimension of apparatus is small, the operating performance it, the effectiveness in dust removing will be better. The dust removing apparatus of the present invention will not only remove fine dust particles, but also can reduce noise. The sound generated by the dust removing apparatus of the present invention is much lower than that of the prior art apparatus.

It will be understood that the foregoing is only illustrative of the principles of the invention, and that various modifications can be made by those skilled in the art without departing from the scope and spirit of the invention.

What is claimed is:

1. A decelerated centrifugal dust removing apparatus for a dust cleaner, comprising:
   (a) a cylinder;
   (b) a conical cylinder; wherein a lower end portion of said conical cylinder is larger than an upper end portion thereof;
   (c) a dust collector box, wherein said cylinder, said conical cylinder, and said dust collector box are connected in said given order from an upper portion to a lower portion of the apparatus;
   (d) an air outlet pipe provided on the upper end portion of said cylinder and is disposed longitudinally and enters into said cylinder;
   (e) an air inlet pipe provided on an upper portion of an outer wall of the cylinder; and
   (f) an umbrella-shaped reflecting disc positioned under the air outlet pipe of the conical cylinder, said umbrella-shaped reflecting disc defining a hole in the center portion thereof for returning air, and said umbrella-shaped reflecting disc and said conical cylinder defining an annular gap between the periphery of said umbrella-shaped reflector and a side wall of said conical cylinder to allow falling dust to pass therebetween.

2. The decelerated centrifugal dust removing apparatus for a dust cleaner according to claim 1, wherein said air inlet pipe goes around the side wall of the cylinder at least by 90° of arc of a circle before it enters into the cylinder.

3. The decelerated centrifugal dust removing apparatus for a dust cleaner according to claim 1, further comprising a plurality of ribs disposed in the annular gap for the falling down of dust to fix the connection of the umbrella-shaped reflecting disc.

4. The decelerated centrifugal dust removing apparatus for a dust cleaner according to claim 1, wherein said umbrella-shaped reflector is situated under the conical cylinder.

5. The decelerating centrifugal dust removing apparatus for a dust cleaner according to claim 1, wherein said umbrella-shaped reflector is situated above the dust collecting box.

6. The decelerating centrifugal dust removing apparatus for a dust cleaner according to claim 1, wherein the range of the optimum diameter of the cylinder is between 18 mm and 80 mm, and wherein the range of the optimum height h is between 0.8 and 1.5 times the diameter of the cylinder.

7. The decelerating centrifugal dust removing apparatus for a dust cleaner according to claim 1, wherein the range of the optimum diameter of the air outlet pipe is between 3 and 40 mm, wherein the range of the optimum width of the flared opening in the lower part of the air outlet pipe is less than 0.3 times the diameter of the cylinder.

8. The decelerating centrifugal dust removing apparatus for a dust cleaner according to claim 1, wherein the range of the optimum conical angle of the conical cylinder is between 5° and 60°.

9. The decelerating centrifugal dust removing apparatus for a dust cleaner according to claim 1, wherein the range of the optimum width to height ratio of the air inlet pipe is between 0.1 and 1.

10. The decelerating centrifugal dust removing apparatus for a dust cleaner according to claim 1, wherein the range of the optimum diameter of the hole for return air is less than 0.5 times the diameter of the cylinder.

11. The decelerating centrifugal dust removing apparatus for a dust cleaner according to claim 1, wherein the range of the optimum width of the annular gap for the falling down of dust is less than 0.5 times the diameter of the cylinder.

* * * * *